(12) United States Patent
Nguyen et al.

(10) Patent No.: US 11,755,938 B2
(45) Date of Patent: Sep. 12, 2023

(54) GRAPHICAL USER INTERFACE INDICATING ANOMALOUS EVENTS

(71) Applicant: SPLUNK INC., San Francisco, CA (US)

(72) Inventors: Nghi Nguyen, San Francisco, CA (US); Jacob Leverich, San Francisco, CA (US); Adam Oliner, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 633 days.

(21) Appl. No.: 16/776,302

(22) Filed: Jan. 29, 2020

(65) Prior Publication Data

US 2020/0167681 A1    May 28, 2020

Related U.S. Application Data

(63) Continuation of application No. 14/609,135, filed on Jan. 29, 2015, now Pat. No. 10,572,811.

(51) Int. Cl.
*G06N 7/01* (2023.01)
*G06N 20/00* (2019.01)
*G06F 3/00* (2006.01)

(52) U.S. Cl.
CPC ............. *G06N 7/01* (2023.01); *G06F 3/00* (2013.01); *G06N 20/00* (2019.01)

(58) Field of Classification Search
None
See application file for complete search history.

(56) References Cited

U.S. PATENT DOCUMENTS

| | | |
|---|---|---|
| 2007/0031838 A1 | 2/2007 | Ambrose et al. |
| 2008/0172264 A1 | 7/2008 | Hoefelmeyer |
| 2014/0297572 A1 | 10/2014 | Zambon |
| 2015/0195296 A1 | 7/2015 | Vasseur et al. |

OTHER PUBLICATIONS

SAS. SAS/Insight 9.1 User's Guide. 2004. SAS Publishing. pp. i-ii, 50, 72-75, 151, 324, 510-511, and 754. (Year: 2004).*
Chandola V, Banerjee A, Kumar V. Anomaly detection: A survey. ACM computing surveys (CSUR). Jul. 30, 2009;41(3):1-58. (Year: 2009).*

(Continued)

*Primary Examiner* — Vincent Gonzales
(74) *Attorney, Agent, or Firm* — Shook, Hardy & Bacon L.L.P.

(57) ABSTRACT

Methods and systems for determining event probabilities and anomalous events are provided. In one implementation, a method includes: receiving source data, where the source data is configured as a plurality of events with associated timestamps; searching the source data, where the searching provides a search result including N events from the plurality of events, where N is an integer greater than one, where each event of the N events includes a plurality of field values, where at least one event of the N events can include one or more categorical field values and one or more numerical field values; and for an event of the N events, determining a probability of occurrence for each field value of the plurality of field values; and using probabilities determined for the plurality of field values, determining a probability of occurrence for the event.

29 Claims, 16 Drawing Sheets

(56) References Cited

OTHER PUBLICATIONS

Borowiak K, Lavery R. An Animated Guide: SAS Editor Regular Expressions. Northeast SAS Users Group, Sep. 14-17, 2008. Pittsburgh, Pennsylvania. 4 pages. (Year: 2008).*
Kumar S. Survey of current network intrusion detection techniques. Washington Univ. in St. Louis. Dec. 2007:1-8. (Year: 2007).*
Bhuyan MH, Bhattacharyya DK, Kalita JK. Network anomaly detection: methods, systems and tools. IEEE communications surveys & tutorials. Jun. 6, 2013;16(1):303-36. (Year: 2013).*
SAS. SS/Insight 9.1 User's Guide. 2004. SAS Publishing. 824 pages. (Year: 2004).*
Denning, D., and Neumann, P. G., "Requirements and Model for IDES—A Real-Time Intrusion-Detection Expert System", SRI Project 6169-10, p. 74 (Aug. 1985).
Scott D. W., "Scott's Rule", Wiley Interdisciplinary Reviews: Computational Statistics, vol. 2, No. 4, pp. 497-502 (Year: 2010).
Karlsson, M., and Hagersten, E., "Timestamp-Based Selective Cache Allocation", High Performance Memory Systems, Springer New York, pp. 50-65 (2004).
Ross, S. M.,"Introduction to Probability Models", Eighth Edition, Academic Press, pp. 1-96 (2003).
Russell, S. J., and Norvig, P. "Artificial Intelligence: A Modern Approach", 2nd Ed., pp. 462-648 (2003).

* cited by examiner

```
Original Search: 501
search "error | stats count BY host

Sent to peers: 502
search "error | prestats count BY host (map)

Executed by search head: 503
Merge prestats results received from peers (reduce)
```

| Events | Event Probability | Anomalous Event? |
|---|---|---|
| Event 911 | 0.2 | NO |
| Event 912 | 0.05 | YES |
| Event 913 | 0.11 | NO |

FIG. 9A

| Events | Event Probability | Anomalous Event? |
|---|---|---|
| Event 911 | 0.2 | NO |
| Event 913 | 0.11 | NO |

FIG. 9C

Summary of Results 1001

| | |
|---|---|
| Number of Events Analyzed | 1,000,000 |
| Number of Anomalous Events | 250 |
| Number of Non-Anomalous Events | 999,750 |
| Maximum Event Probability | 0.6 |
| Minimum Event Probability | 0.02 |
| Average Event Probability | 0.3 |
| Median Event Probability | 0.25 |

GRAPHICAL USER INTERFACE INDICATING ANOMALOUS EVENTS

CROSS-REFERENCE TO RELATED APPLICATIONS

This application is a Continuation of U.S. patent application Ser. No. 14/609,135 filed Jan. 29, 2015 and titled "METHODS AND SYSTEMS FOR DETERMINING PROBABILITIES OF OCCURRENCE FOR EVENTS AND DETERMINING ANOMALOUS EVENTS," the entire contents is being incorporated by reference herein in its entirety.

BACKGROUND

Modern data centers often include thousands of hosts that operate collectively to service requests from even larger numbers of remote clients. During operation, components of these data centers can produce significant volumes of machine-generated data. In order to reduce the size of the data, it is typically pre-processed before it is stored. In some instances, the pre-processing includes extracting and storing some of the data, but discarding the remainder of the data. Although this may save storage space in the short term, it can be undesirable in the long term. For example, if the discarded data is later determined to be of use, it may no longer be available.

In some instances, techniques have been developed to apply minimal processing to the data in an attempt to preserve more of the data for later use. For example, the data may be maintained in a relatively unstructured form to reduce the loss of relevant data. Unfortunately, the unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority. Moreover, processing of the data may return a large amount of information that can be difficult for a user to interpret. For example, if a user submits a search of the data, the user may be provided with a large set of search results for the data but may not know how the search results relate to the data itself or how the search results relate to one another. As a result, a user may have a difficult time deciphering what portions of the data or the search results are relevant to her/his inquiry.

Determining which results (specifically events, as explained in greater detail below) are anomalous and presenting that information to the user is likely to help the user focus on the more relevant data in the search result. This is because an anomalous event is more likely to contain clues regarding solutions to a problem that the user may be attempting to address in conducting an inquiry. Existing systems provide a method, such as the one using the AnomalousValues command, to determine which events are anomalous. This existing method does not involve determining or calculating the probability of occurrence of the events. Instead, this existing method determines the probability of occurrence of the field values and designates as anomalous an event containing a field value with the lowest probability of occurrence. Alternatively, it may designate a set of events as anomalous, where each event in the set contains a field value with one of the lowest probabilities of occurrence. However, containing a field value with the lowest probability of occurrence is not an accurate indicator of the probability of occurrence of an event. In other words, an event that contains the field value with the lowest probability of occurrence is not necessarily an anomalous event. For example, a first event containing a field value with the lowest probability of occurrence may also contain many other field values with high probabilities of occurrence, whereas a second event that does not contain the field value with the lowest probability of occurrence, may contain many field values with low probabilities of occurrence. In such an example, the second event may be more anomalous than the first event. Accordingly, the above existing method of designating an anomalous event may inaccurately designate an event as anomalous.

SUMMARY

In embodiments of the present invention, the probability of occurrence for each field value in events is determined. Using the probabilities of occurrence for the field values, the probability of occurrence for each event is determined. Thereafter, the probabilities of occurrence for the events are used to determine anomalous events. As the probability of occurrence for the events, rather than the field values, is used to determine anomalous events, embodiments of the present invention provide a more accurate method of determining which events are anomalous.

In one aspect, an embodiment of the present invention provides a computer-implemented method including: receiving source data, where the source data includes raw data, further where the source data is configured as a plurality of events, each event of the plurality of events having an associated timestamp; using one or more extraction rules, searching the source data, the one or more extraction rules defining one or more fields, where the searching provides a search result including N events from the plurality of events, where N is an integer greater than one, where each event of the N events includes a plurality of field values, where at least one event of the N events can include one or more categorical field values and one or more numerical field values; and for an event of the N events, determining a probability of occurrence for each field value of the plurality of field values; and using probabilities determined for the plurality of field values, determining a probability of occurrence for the event.

In one embodiment, the computer-implemented method includes, for each event of the N events, determining a probability of occurrence for each field value of the plurality of field values; and using probabilities of occurrence determined for the plurality of field values, determining a probability of occurrence for the each event; and for the N events, determining at least one outlier event.

BRIEF DESCRIPTION OF THE DRAWINGS

FIG. 5 illustrates an exemplary search query received from a client and executed by search peers in accordance with the disclosed embodiments.

FIG. 6B illustrates a data summary dialog that enables a user to select various data sources in accordance with the disclosed embodiments.

FIG. 9A illustrates one embodiment of a display provided in response to a request for anomalous event determination.

FIG. 9C illustrates another embodiment of a display provided in response to a request for anomalous event determination.

FIG. 10 illustrates an embodiment of a display providing a summary of results for an anomalous event determination.

DETAILED DESCRIPTION 1.1 Overview

Figure 1:
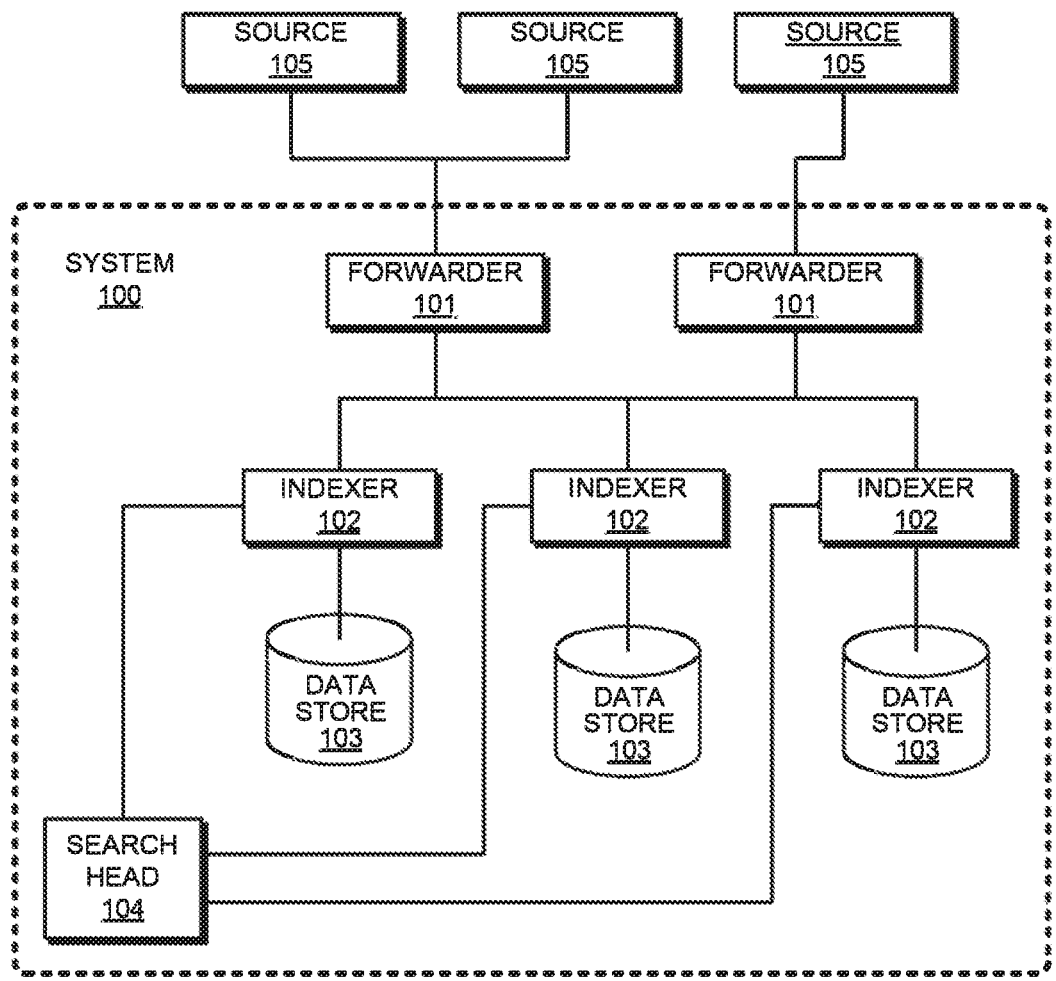
FIG. 1 presents a block diagram of an event-processing system in accordance with the disclosed embodiments.

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements, or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
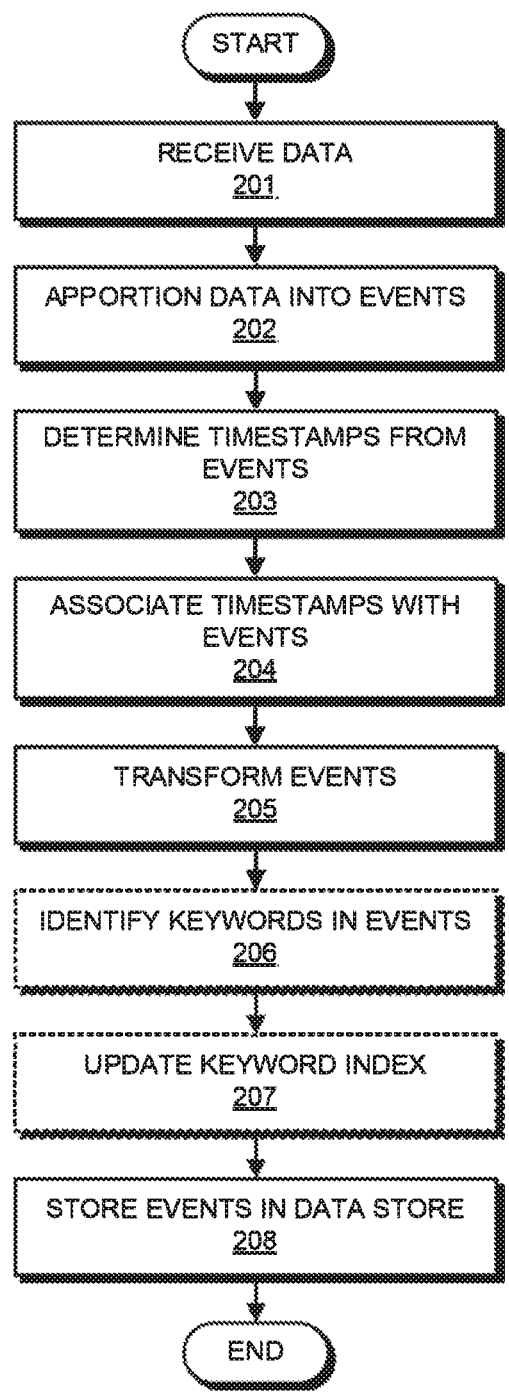
FIG. 2 presents a flowchart illustrating how indexers process, index, and store data received from forwarders in accordance with the disclosed embodiments.

FIG. 2 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event.

Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored in flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. application patent Ser. No. 14/266,817 also filed on 30 Apr. 2014.

1.4 Query Processing

Figure 3:
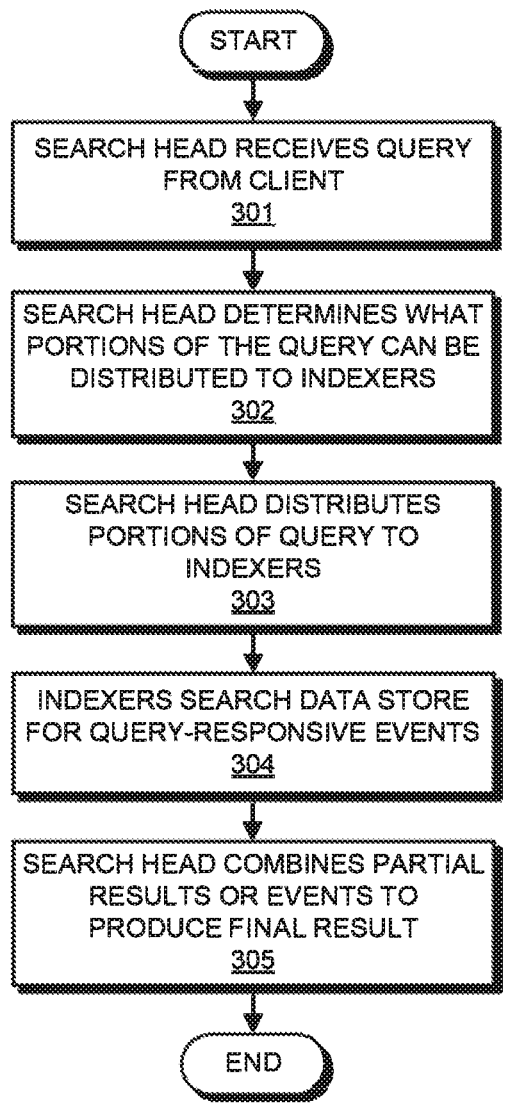
FIG. 3 presents a flowchart illustrating how a search head and indexers perform a search query in accordance with the disclosed embodiments.

FIG. 3 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
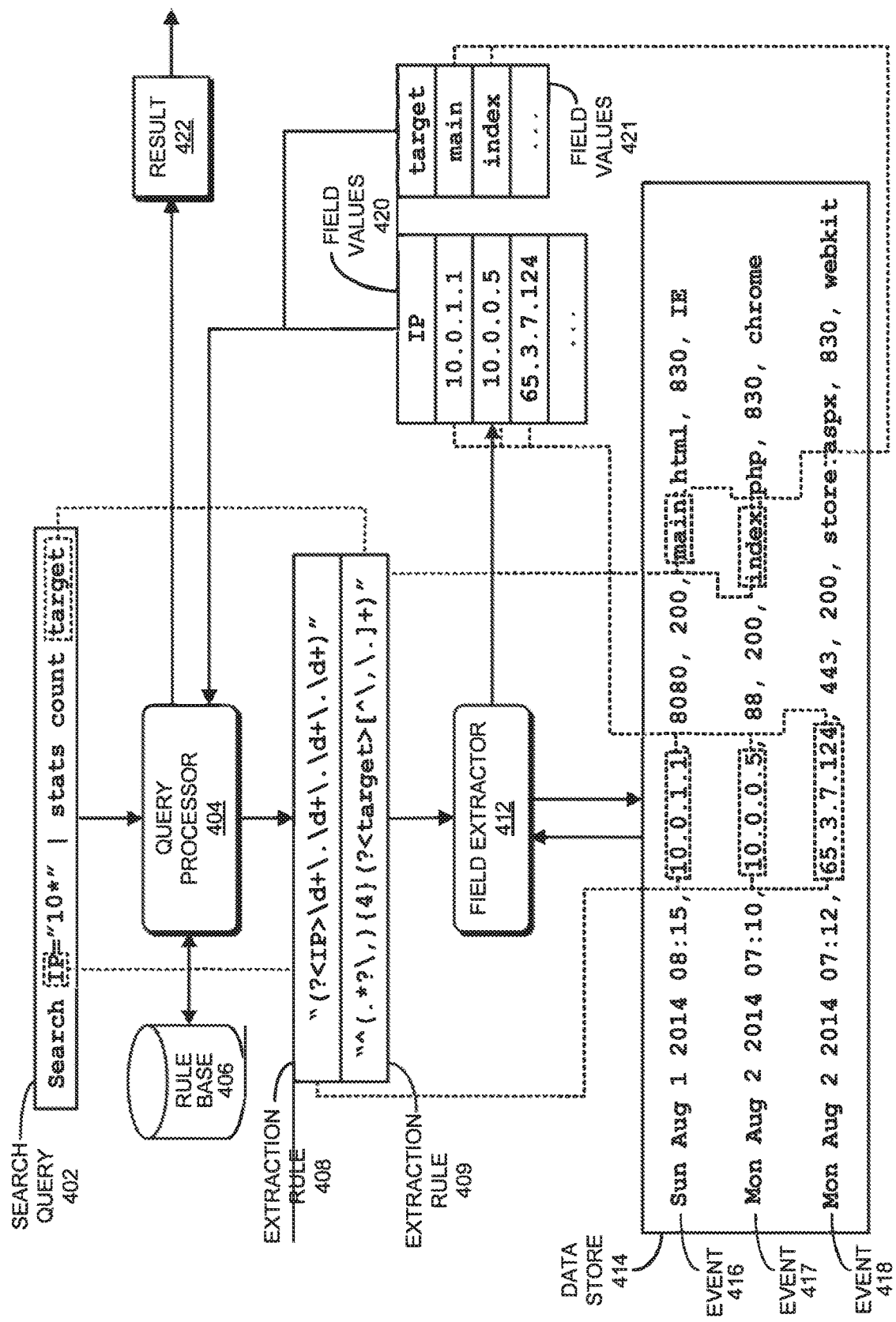
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 6A:
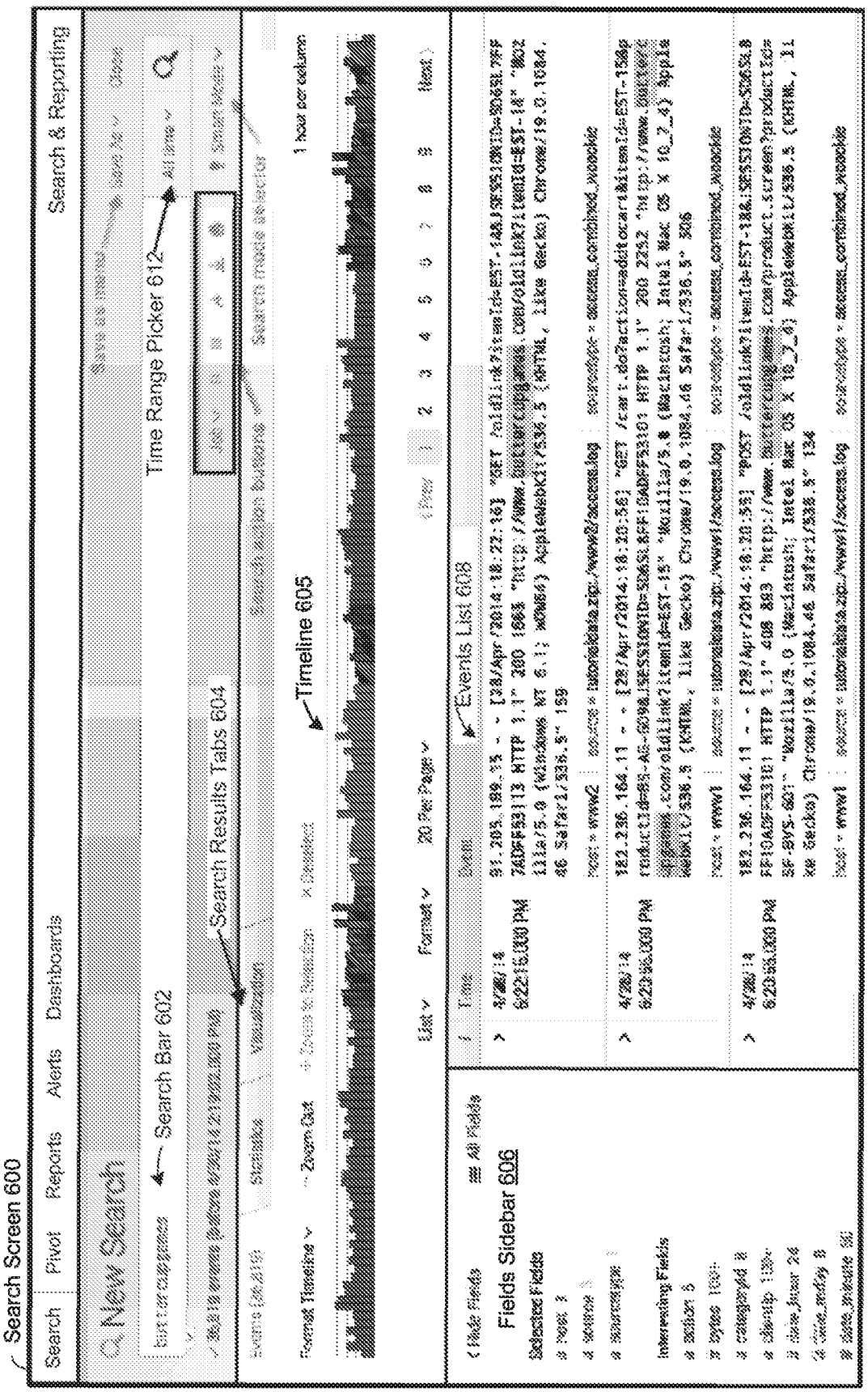
FIG. 6A illustrates a search screen in accordance with the disclosed embodiments.
Figure 6B:
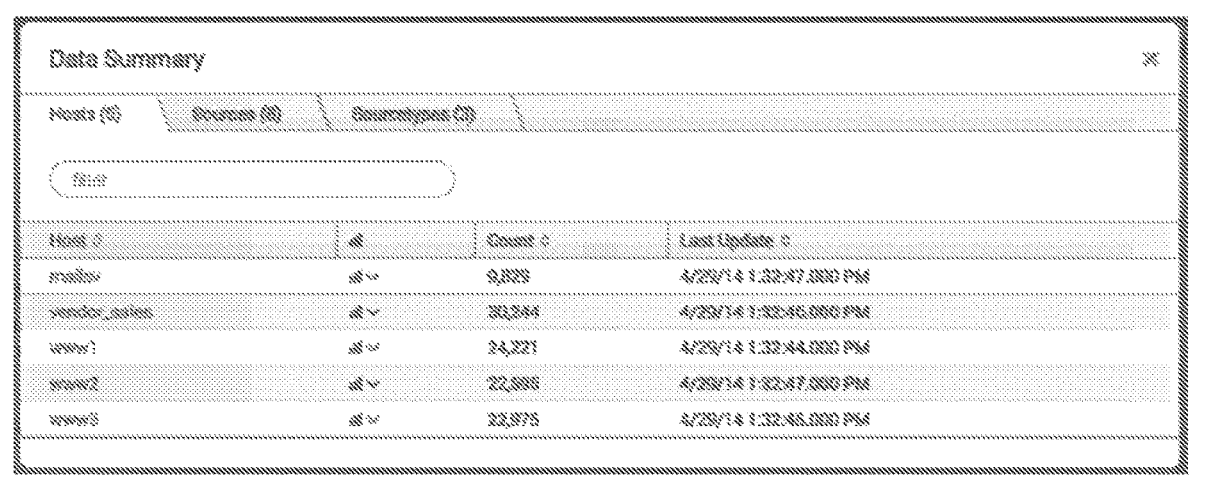

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 include: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can be split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices, and sensors. The security-related information can also originate from various sources in a network, such as routers, switches, email servers, proxy servers, gateways, firewalls, and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
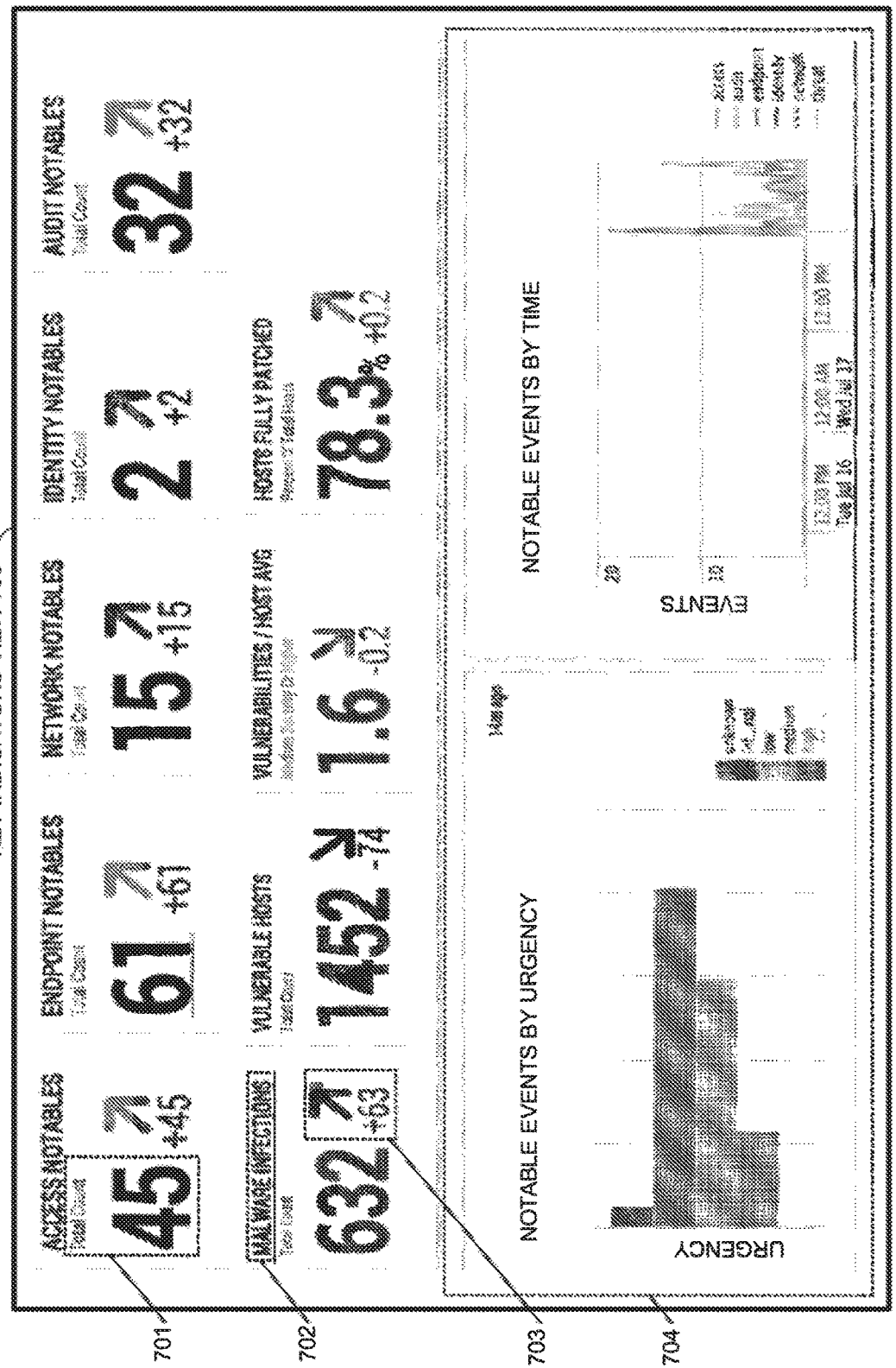
FIG. 7A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
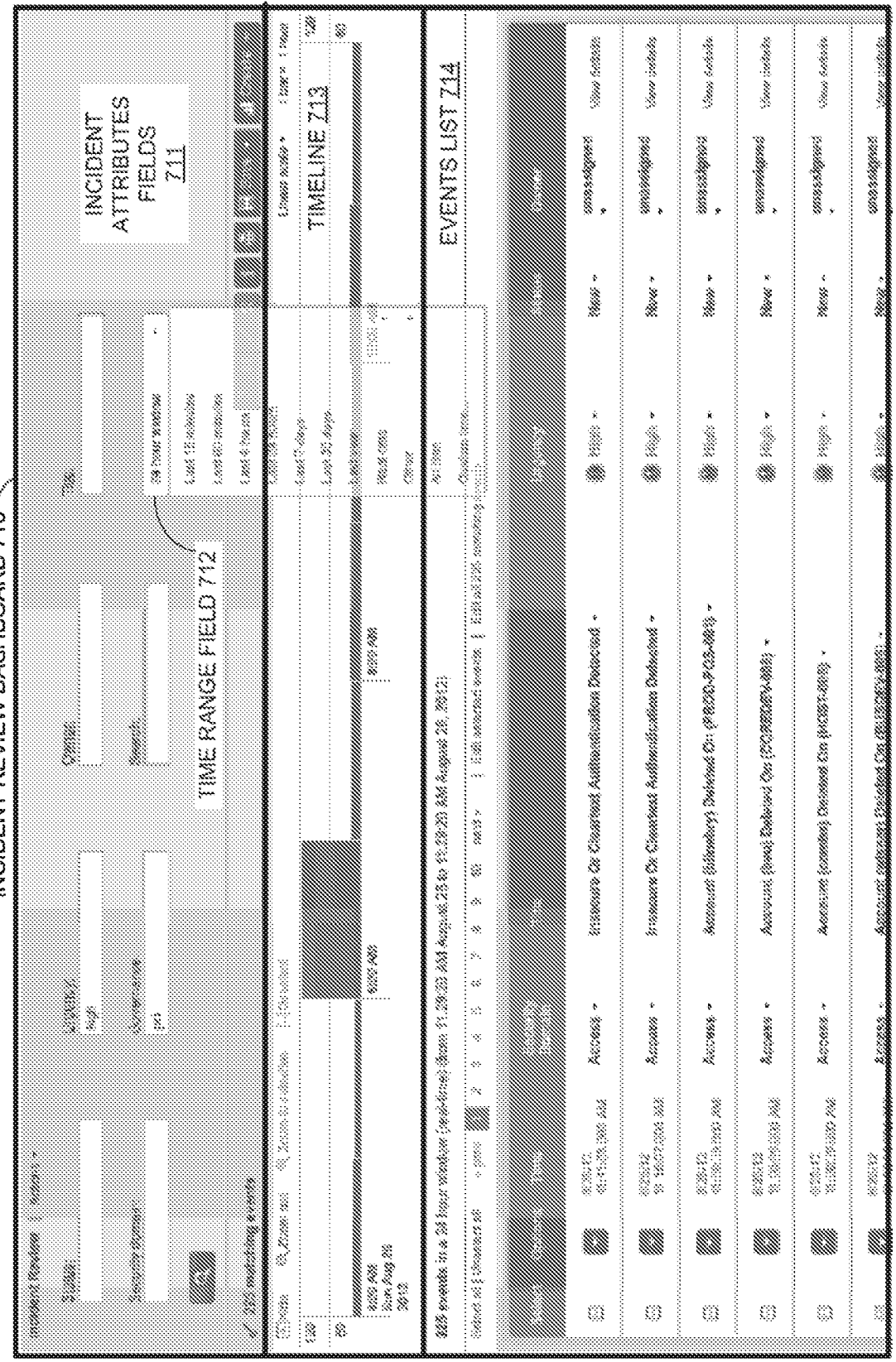
FIG. 7B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent application Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware-.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
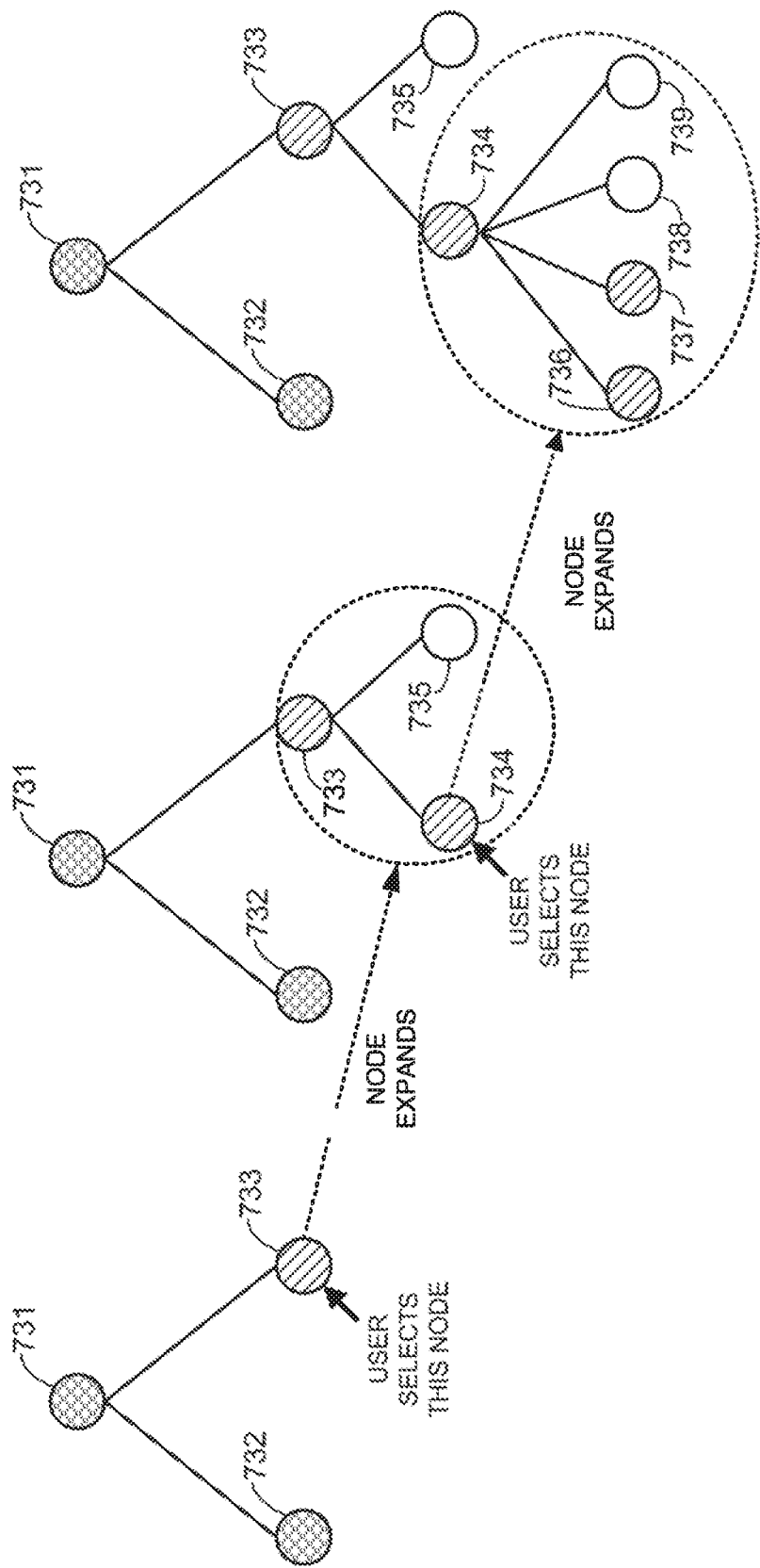
FIG. 7C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state, or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
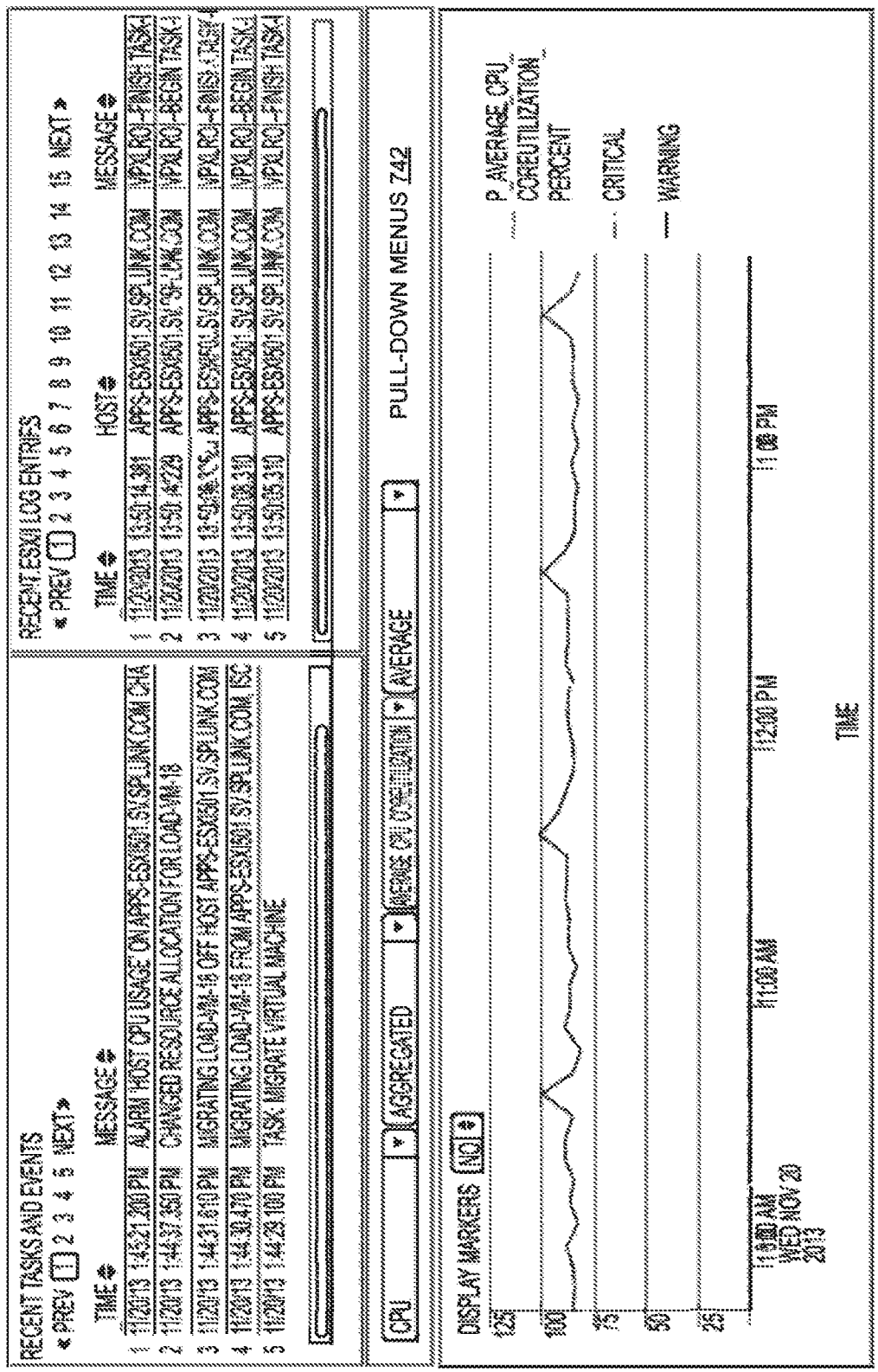
FIG. 7D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data, and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

1.10 Event Probability Determination and Anomalous Event Detection

Figure 8:
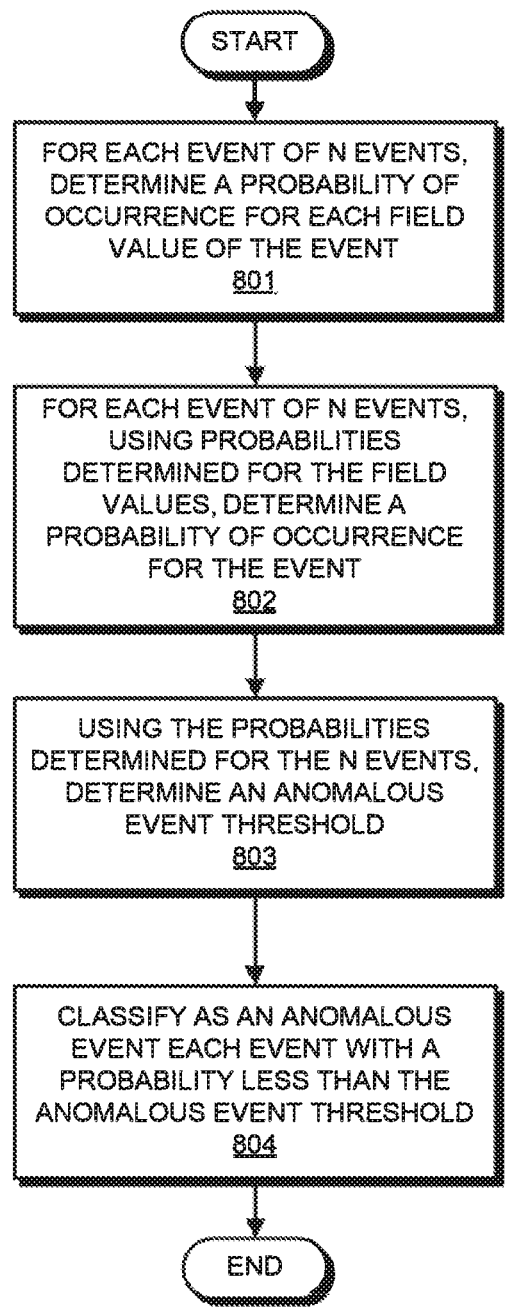
FIG. 8 presents a flowchart illustrating a method of determining event probabilities and detecting anomalous events.

As noted above, searching the source data can provide a search result containing a number of events. In one embodiment, searching the source data provides a search result including N events, where N is an integer greater than one. As also noted above, in one embodiment, the searching includes using one or more extraction rules defining one or more fields. FIG. 8 presents a flowchart illustrating a method of determining event probabilities and detecting anomalous events. The method illustrated in FIG. 8 can be used, for example, on a search result that provides a search result comprising N events.

In FIG. 8, at block 801, for each event of the N events, the system determines a probability of occurrence for each field value of the event. The method used for determining the probability of occurrence for a field value depends on the type of field value. There are generally three types of field values: categorical field values, numerical field values, and NULL field values. A categorical field value is generally represented by a symbol other than a number. For example, in FIG. 4, the field values "main" and "index" are categorical field values of the "target" field. In some instances, a categorical value may be represented by a number. For example, a field "floor," as in a floor of a building, may have field values represented by numbers. Such a field value may nonetheless be a categorical field value. In one embodiment, the system determines whether a field value is categorical or numerical. In another embodiment, the system provides the user the option of designating a field value as categorical or numerical. A numerical field value is represented by a number. For example, in FIG. 4, the field values in the field time can be numerical field values. A NULL field value indicates that the field value for a field is missing for one or more events. In other words, a NULL field value for a field value in an event indicates that the field value does not have a value for that event.

Table 1 below illustrates an example of N events and their corresponding field values:

TABLE 1

| Events | Field A | Field B | . . . | Field Z |
|---|---|---|---|---|
| Event 1 | 2.5 | server | . . . | 1.5 |
| Event 2 | NULL | router | . . . | 2.1 |
| . . . | . . . | . . . | . . . | . . . |
| Event N | 3.4 | NULL | . . . | 1.7 |

Table 1 includes events 1 to N and fields A to Z, where each event includes field values for fields A to Z. In Table 1, fields A and Z are numerical fields which have numerical field values (e.g., 2.5 and 1.5), whereas field B is a categorical field which has categorical field values (e.g., server and router). Also, in Table 1, event 2 does not have a field value for field A. As a result, for event 2, the field value for field A is a NULL field value. Similarly, in Table 1, event N does not have a field value for field B. As a result, for event N, the field value for field B is a NULL field value.

For a categorical field value, the probability of occurrence for the field value is equal to equal to O divided by N, where O is an integer that represents the total number of times the categorical field value occurs in the N events.

For a numerical field value, in one embodiment, the probability of occurrence for the numerical field value is determined using a histogram-based estimation. In one such embodiment, the probability of occurrence for the numerical field value is equal to P divided by N, where P is equal to the number of numerical field values in a bin containing the numerical field value, where the width of the bin is equal to C divided by the cube root of N, and where C is equal to 3.5 times the standard deviation of field values for the numerical field value in the N events. In other words, the bin width is determined according to Scott's rule where the bin width is equal to $C/(N)^{1/3}$. In another embodiment, for a numerical field value, the probability of occurrence for the numerical field value is determined using kernel density estimation, quantile estimation, or an empirical cumulative distribution function. It is to be noted that histogram-based estimation, kernel density estimation, quantile estimation, and empirical cumulative distribution function methods are all examples of density determination methods for determining a probability of occurrence. It is also to be noted that histogram-based estimation, kernel density estimation, quantile estimation, and empirical cumulative distribution function methods for determining the probability of occurrence for numerical field values can be used with both normal and non-normal distributions (such as, for example, exponential distributions, log-normal distributions, bimodal distributions, and multimodal distributions) of field values to produce accurate results.

For a NULL field value, the method used for calculating the probability of occurrence of the field value depends on whether the field value is a categorical NULL field value or a numerical NULL field value. In one embodiment, for categorical NULL field values, the NULL field value is treated as a field value category. In such an embodiment, for the NULL categorical field, the total number of NULL categorical field values is determined and that total number is divided by N to determine the probability of occurrence for the NULL categorical field. In one embodiment, for numerical NULL field values, a bin is designated for NULL field values. In such an embodiment, the probability of occurrence of a numerical field value is equal to the total number of NULL field values in the numerical NULL field value bin divided by N.

At block 802, for each event of the N events, using probabilities determined for the field values for the event, the system determines (i.e., calculates or computes) a probability of occurrence for the event. In one embodiment, the probability of occurrence for the event is equal to the product of the probabilities of occurrence determined for the field values of the event. In one embodiment, this method of determining the probability of occurrence for the event is used in cases where there is conditional independence between the fields of the event. In another embodiment, this method can be used even in cases where there is no conditional independence between the fields of the event. In yet another embodiment, the probability of occurrence for the event is determined (a) using a dense frequency table to compute a conditional probability, (b) (i) clustering events using a distance measure that combines categorical similarity and numeric distance, (ii) using cluster size divided by dataset size as a density estimate, and (iii) using the density estimate to compute the conditional probability, or (c) using a conditional probability table or a custom function to compute the conditional probability. In one embodiment, these methods of determining the probability of occurrence for the event are used in cases where there is no conditional independence between the fields of the event. In another embodiment, these methods can be used even in cases where there is conditional independence between the fields of the event.

In one embodiment, an event can have one or more categorical field values, one or more numerical field values, and one or more NULL field values. As a result, the determination of the probability of the occurrence for such an event would involve using probabilities of occurrence for one or more categorical field values, probabilities of occurrence for one or more numerical field values, and probabilities of occurrence for one or more NULL field values.

At block 803, using the probabilities determined for the N events, the system determines an anomalous event threshold. In one embodiment, determining an anomalous event threshold includes (1) determining a first quartile value, a second quartile value, and a third quartile value for event probabilities of occurrence of the N events, where a quarter of the event probabilities of occurrence are less than or equal to the first quartile value, where half of the event probabilities of occurrence are less than or equal to the second quartile value (i.e., the second quartile value represents the median of the event probabilities of occurrence), and where three quarters of the event probabilities of occurrence are less than or equal to the third quartile value; (2) determining an interquartile range, where the interquartile range is equal to the third quartile value minus the first quartile value; and (3) determining an anomalous event threshold, where the anomalous event threshold is equal to the first quartile value minus k times the interquartile range, where k is a positive number parameter. In one embodiment, k is set to 1.5 by default. In one embodiment, the value of k is adjustable by the user who can override the default value of 1.5 set by the system.

At block 804, the system compares each of the event probabilities against the anomalous event threshold and classifies as an anomalous event each event whose probability of occurrence is less than the anomalous event threshold. In another embodiment, the system classifies or designates as an anomalous event each event whose probability of occurrence is less than or equal to the anomalous event threshold.

An anomalous event may also herein be referred to as an outlier event. Thus, the above described method of determining an anomalous event threshold and comparing the event probabilities against the anomalous event threshold to determine which events are anomalous may also be referred to as a method of determining an outlier event or events. In another embodiment, one or more outlier events may be determined by using histogram-based density estimation, kernel density estimation, quantile estimation, an empirical cumulative distribution function, or a Z test.

In one embodiment, the system determines at least one outlier event in response to receiving an anomalous event determination command. In one embodiment, the anomalous event determination command has the following general format anomalydetection [max] [field-list]. In the above command format, "max" represents the maximum number of anomalous events that the user requests the system to output. Also, in the above command, "field list" represents a list of specified search result fields and indicates that the user requests that the system use only fields in the list of specified search result fields in determining anomalous events. In one embodiment, even if the "max" parameter is nonzero, the actual output by the system in response to the anomalydetection command may be empty. Also, in one embodiment, if the "max" parameter is not specified by the user, the system outputs all the anomalous events. Also, in one embodiment, if the "field-list" parameter is not specified by the user, then the system will consider all fields produced by the search result in determining anomalous events. The following is one example of the anomalydetection command in a search pipeline: index=_internal source=*metrics.log group=queue|anomalydetection. As can be seen in this example, the "max" and "field-list" parameters are not specified. As the "max" parameter is not specified by the user, the system, in response to this command, will output all the anomalous events that it determines exist in the search preceding the pipeline symbol. The following is another example of the anomalydetection command in a search pipeline: index=_internal source=*metrics.log group=queue|anomalydetection max=30 current_size largest_size. As can be seen in this example, the "max" and "field-list" parameters are specified. As the "max" parameter is specified to be 30, the system in response to this command will output a maximum of 30 of the most anomalous events that it determines exist in the search preceding the pipeline symbol. It is to be noted that it is possible that less than 30 anomalous events would be displayed in response to the above command. This can occur, for example, if there are less than 30 anomalous events found by the system. Also, as the "field-list" parameters are specified as "current_size" and "largest_size" only the field values for the fields "current_size" and "largest_size" are used in making the anomalous event determination in response to this command.

In one embodiment, in response to receiving an anomalous event determination command, such as one described above, the system (1) determines the probability of occurrence for the relevant events, (2) determines outlier events, and (3) causes the user interface to display results of its determinations. FIG. 9A illustrates one embodiment of such a display. The display illustrated in FIG. 9A is a simplified display that shows only the events output in response to the anomalous event determination command, the probability of occurrence for those events, and whether those events are anomalous. This is done in the interest of avoiding cluttering the drawing with details that are not part of the focus of the below description. In FIG. 9A, user interface display or screen 900 includes a result table 905. Result table 905 includes an events column that lists the output events, an event probability column that lists the event probability values for each of the output events, and an anomalous event column that indicates whether or not an output event is anomalous. In result table 905, in the interest of simplicity, and by way of example, only three events (events 911-913) are shown. Normally, a result table would include many more than three events, but in some cases may include less than three events. As can be seen from result table 905, event 911 has an event probability of 0.2, event 912 has an event probability of 0.05, and event 913 has an event probability of 0.11. In the embodiment illustrated in FIG. 9A, it is assumed that the system has determined that the anomalous event threshold is equal to 0.1. Therefore, events 911 and 913 are not anomalous events, whereas event 912 is an anomalous event. As can be seen in FIG. 9A, in the anomalous event column, events 911 and 913 are designated as not being anomalous, whereas event 912 is designated as being anomalous. In one embodiment, the anomalous events in result table 905 may be highlighted.

Also, in one embodiment, the probabilities of the events can be charted versus a time scale to help visualize how the probabilities vary over time. Similarly, in one embodiment, the number of anomalous events can be charted versus time to help visualize how the number of anomalous events varies over time. Such charts may be similar in format to the timeline illustrated in FIG. 6A.

Also, in one embodiment, prior to causing a display, such as, for example, display 901, the system creates and adds a field to each event indicating whether the event is anomalous. In one embodiment, the status of events as anomalous or not anomalous may be used for filtering events. For example, a user may wish to filter out anomalous events and view data or charts for only non-anomalous events. Such filtering removes outlier events and avoids having data points which (e.g., the outlier events) necessitate having a very wide range on a chart that displays the data points. In another example, the user may wish to filter out non-anomalous events. Such filtering allows the user to more easily focus on and inspect the anomalous events. In another embodiment, the user may filter out the non-anomalous events and calculate, only for the anomalous events, the average field value or the probability of occurrence for a field value.

Figure 9B:
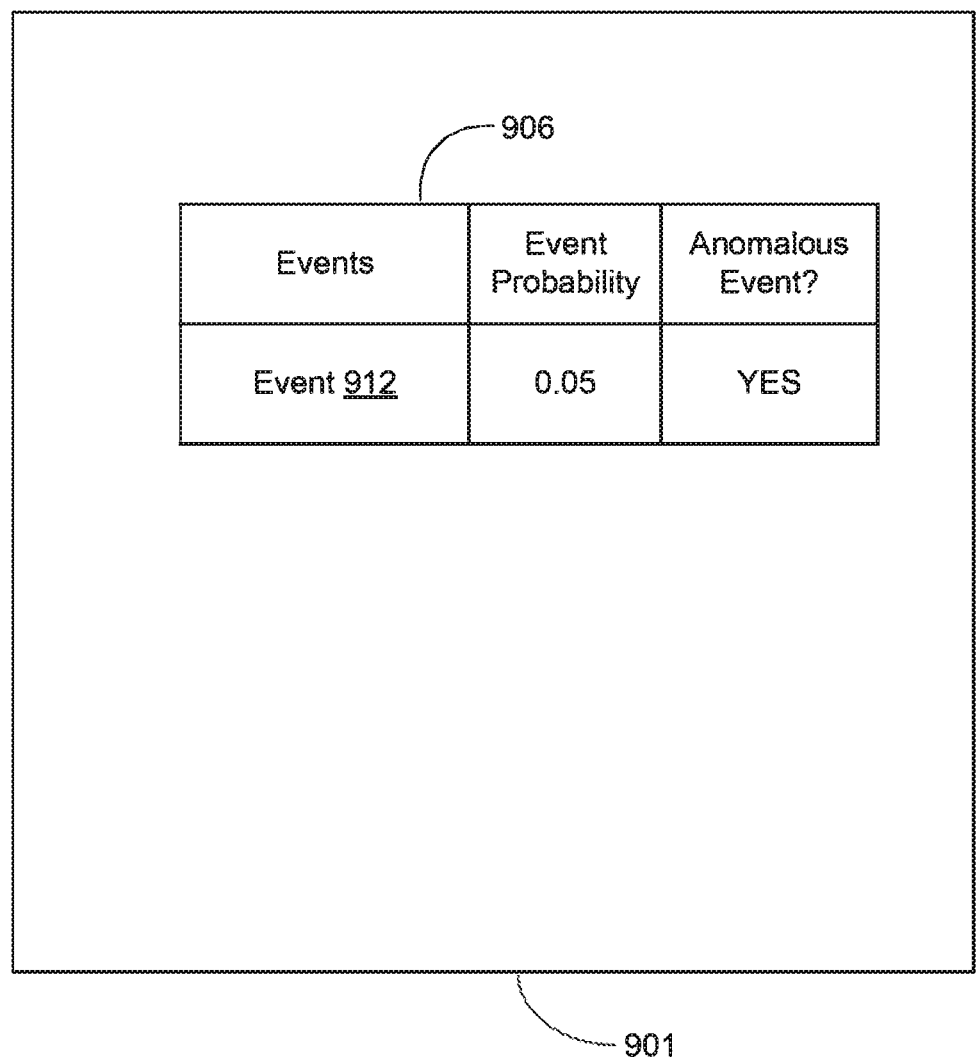
FIG. 9B illustrates another embodiment of a display provided in response to a request for anomalous event determination.

In an alternative embodiment, rather than showing all the events, only anomalous events are displayed on the user interface. FIG. 9B illustrates such an alternative embodiment. In FIG. 9B, result table 906 is shown on display 901. As can be seen in FIG. 9B, result table 906 shows event 912, which is an anomalous event, but does not show events 911 and 913, which are not anomalous events. Result table 906 also shows the event probability 0.05 for event 912 and the status of event 912 as an anomalous event.

In another alternative embodiment, rather than showing all the events, only non-anomalous events are displayed on the user interface. FIG. 9C illustrates such an alternative embodiment. In FIG. 9C, table 907 is shown on display 902. As can be seen in FIG. 9C, result table 907 shows events 911 and 913, which are not anomalous events, but does not show event 912, which is an anomalous event. Result table 907 also shows the event probability of 0.2 for event 911, the event probability of 0.11 for event 913, and the status of events 911 and 913 as non-anomalous events.

In yet another embodiment, the system summarizes the results of running the anomalous event determination command and causes the user interface to display a summary of the results. FIG. 10 illustrates an embodiment of such a display. In FIG. 10, display 1000 includes a summary of results 1001. The summary of results 1001 provides (1) the number of events analyzed, which in the illustrated example is 1,000,000, (2) the number of anomalous events found, which in the illustrated example is 250, (3) the number of non-anomalous events found, which in the illustrated example is 999,750, (4) the maximum event probability, which in the illustrated example is 0.6, (5) the minimum event probability, which in the illustrated example is 0.02, (6) the average event probability, which in the illustrated example is 0.3, and (7) the median event probability, which in the illustrated example is 0.25. In another embodiment, a different status of summary results (including additional results) may be displayed. In one embodiment, the results included in the summary of results 1001 are calculated in response to a "stat" command. The description above (e.g., that of FIG. 6A) provides additional information regarding statistical results.

In one embodiment, results, such as those included in the summary of results 1001, are calculated for only anomalous event or for only non-anomalous events. In such a case, the status of the event as anomalous or non-anomalous is used to filter out events whose data will not be used to calculate the desired statistical data.

In one embodiment, events are grouped by time range (e.g., by hour, by day, etc.). In one embodiment, the range is determined automatically by the system. In one embodiment, the grouped events are displayed over time. In one embodiment, prior to grouping the events by time range, the events may be filtered based on their anomalous status. This allows for grouping only anomalous events by time range or only non-anomalous events by time range. The description above (e.g., that of FIG. 6A) provides additional information regarding grouping results in terms of time ranges.

In one embodiment, a user is provided with the option of selecting the type of display that the user interface provides in response to the event probability and anomaly determinations. These can, for example, be displays similar to those illustrated in FIGS. 9A-C and 10.

While the present invention has been particularly described with respect to the illustrated embodiments, it will be appreciated that various alterations, modifications, and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A computer-implemented method comprising:
causing display of a first portion of a graphical user interface, wherein the first portion includes graphical elements for obtaining an outlier event determination command, the outlier event determination command including an indication of a first event field and a second event field, selected from among a plurality of event fields, to use in determining outlier events;
causing display of a second portion of the graphical user interface, wherein the second portion comprises a table format and includes a set of results associated with the outlier event determination command, wherein the set of results includes:
a set of events in the table format, each event of the set of events including a portion of raw machine data that reflects activity in an information technology environment and that is produced by a component of that information technology environment, and wherein each event includes a plurality of field values including a first field value corresponding with the first event field and a second field value corresponding with the second event field,
a set of probabilities, in the table format, each indicating a probability of occurrence for a corresponding event from the set of events, wherein a probability of occurrence for the corresponding event is determined using a first probability associated with the first field value in the corresponding event and a second probability associated with the second field value in the corresponding event, and wherein the first field value and the second field value correspond to the first event field and the second event field indicated in the outlier event determination command, and
a set of outlier indicators, in the table format, indicating whether the corresponding event is an outlier event, wherein an event is determined to be an outlier using the probability of occurrence for the corresponding event based on probabilities associated with the first event field and the second event field indicated in the outlier event determination command.

2. The computer-implemented method of claim 1, wherein the raw machine data comprises aggregated heterogeneous machine data generated by at least one of: a server, a database, an application, or a network.

3. The computer-implemented of claim 1, wherein a field is defined by an extraction rule for extracting a subportion of text from the portion of raw machine data in an event to produce a value for the field for that event.

4. The computer-implemented method of claim 1, wherein at least one event in the set of events includes a categorical field value and a numerical field value.

5. The computer-implemented method of claim 1, wherein the probability of occurrence for the corresponding event is determined using a probability of occurrence for the first field value, comprising a categorical field value, of the corresponding event and the probability of occurrence for a second field value, comprising a numerical field value, of the corresponding event.

6. The computer-implemented method of claim 1, wherein the first field value comprises a categorical field value and is determined using a first method and the second field value comprises a numerical field value and is determined using a second method different from the first method.

7. The computer-implemented method of claim 1, wherein the first field value comprises a categorical field value, wherein the probability of occurrence for the categorical field value is equal to O divided by a number of events in the set of events, wherein O is an integer that represents total number of times the categorical field value occurs in the set of events.

8. The computer-implemented method of claim 1, wherein the first field value comprises a numerical field value, and wherein the probability of occurrence for the numerical field value is determined using histogram-based density estimation.

9. The computer-implemented method of claim 1, wherein the first field value comprises a categorical field value and the second field value comprises a numerical field value, wherein the probability of occurrence for the categorical field value is equal to O divided by number of events in the set of events, wherein O is an integer that represents total number of times the categorical field value occurs in the set of events, wherein the probability of occurrence for the numerical field value is determined using kernel density estimation, quantile estimation, or an empirical cumulative distribution function.

10. The computer-implemented method of claim 1, wherein each event includes a plurality of field values comprising at least one NULL field value that indicates that the field value does not have a value for the event.

11. The computer-implemented method of claim 1, wherein determining the probability of occurrence for the corresponding event comprises determining a product of a probability of occurrence determined for at least one categorical field value and at least one numerical field value.

12. The computer-implemented method of claim 1, wherein determining the probability of occurrence for the corresponding event comprises (a) using a dense frequency table to compute a conditional probability, (b) (i) clustering events using a distance measure that combines categorical similarity and numeric distance, (ii) using cluster size divided by dataset size as a density estimate, and (iii) using the density estimate to compute the conditional probability, or (c) using a conditional probability table or a custom function to compute the conditional probability.

13. The computer-implemented method of claim 1 further comprising:
for each event of the set of events, determining a probability of occurrence for each field value of the corresponding event, and using the probabilities of occurrence determined for each field value of the corresponding event to determine the probability of occurrence for the corresponding event.

14. The computer-implemented method of claim 1, wherein the event is determined to be the outlier by:
determining a first quartile value, a second quartile value, and a third quartile value for event probabilities of occurrence of the set of events, wherein a quarter of the event probabilities of occurrence are less than or equal to the first quartile value, wherein half of the event probabilities of occurrence are less than or equal to the second quartile value, and wherein three quarters of the event probabilities of occurrence are less than or equal to the third quartile value;
determining an interquartile range, wherein the interquartile range is equal to the third quartile value minus the first quartile value;
determining an outlier event threshold, wherein the outlier event threshold is equal to the first quartile value minus k times the interquartile range, wherein k is a positive number parameter; and
designating the event as an outlier event based on the probability of occurrence for the corresponding event being less than the outlier event threshold.

15. The computer-implemented method of claim 1, wherein the event is determined to be the outlier using at least one of histogram-based density estimation, kernel density estimation, quantile estimation, an empirical cumulative distribution function, and a Z test.

16. The computer-implemented method of claim 1, wherein determining the event is the outlier is performed in response to receiving the outlier event determination command.

17. The computer-implemented method of claim 1 further comprising causing display of an alert indicating the determination of at least one outlier event.

18. The computer-implemented method of claim 1 further comprising:
for each event of the set of events, adding a field indicating whether the event is an outlier event.

19. The computer-implemented method of claim 1 further comprising:
for each event of the set of events, adding a field indicating whether the event is an outlier event; and
filtering out events that are not outliers.

20. The computer-implemented method of claim 1 further comprising:
for each event of the set of events, adding a field indicating the probability of occurrence for the corresponding event.

21. The computer-implemented method of claim 1, wherein each event includes a plurality of field values, wherein a field is defined by an extraction rule for extracting a subportion of text from the portion of raw machine data in an event to produce a value for the field for that event, the extraction rule comprising a regular expression rule (regex rule).

22. The computer-implemented method of claim 1 further comprising storing the set of events in a data source.

23. The computer-implemented method of claim 1, wherein a field is defined by an extraction rule for extracting a subportion of text from the portion of raw machine data in a particular event to produce a value for the field for that particular event, the raw machine data comprising log data, application data, or packet data.

24. One or more non-transitory computer-readable media storing instructions that, when executed by one or more computing devices, cause performance of:
causing display of a first portion of a graphical user interface, wherein the first portion includes graphical elements for obtaining an outlier event determination command, the outlier event determination command including an indication of a first event field and a second event field, selected from among a plurality of event fields, to use in determining outlier events;
causing display of a second portion of the graphical user interface, wherein the second portion comprises a table format and includes a set of results associated with the outlier event determination command, wherein the set of results includes:
a set of events in the table format, each event of the set of events including a portion of raw machine data that reflects activity in an information technology environment and that is produced by a component of that information technology environment, and wherein each event includes a plurality of field values including a first field value corresponding with the first event field and a second field value corresponding with the second event field,
a set of probabilities, in the table format, each indicating a probability of occurrence for a corresponding event from the set of events, wherein a probability of occurrence for the corresponding event is determined using a first probability associated with the first field value in the corresponding event and a second probability associated with the second field value in the corresponding event, and wherein the first field value and the second field value correspond to the first event field and the second event field indicated in the outlier event determination command, and
a set of outlier indicators, in the table format, indicating whether the corresponding event is an outlier event, wherein an event is determined to be an outlier using the probability of occurrence for the corresponding event based on probabilities associated with the first event field and the second event field indicated in the outlier event determination command.

25. A computerized system comprising:
at least one processor; and
computer memory having computer-readable instructions embodied thereon that, when executed by the at least one processor, perform operations comprising:
causing display of a first portion of a graphical user interface, wherein the first portion includes graphical elements for obtaining an outlier event determination command, the outlier event determination command including an indication of a first event field and a second event field, selected from among a plurality of event fields, to use in determining outlier events;
causing display of a second portion of the graphical user interface, wherein the second portion comprises a table format and includes a set of results associated with the outlier event determination command, wherein the set of results includes:
a set of events in the table format, each event of the set of events including a portion of raw machine data that reflects activity in an information technology environment and that is produced by a component of that information technology environment, and wherein each event includes a plurality of field values including a first field value corresponding with the first event field and a second field value corresponding with the second event field, a set of probabilities, in the table format, each indicating a probability of occurrence for a corresponding event from the set of events, wherein a probability of occurrence for the corresponding event is determined using a first probability associated with the first field value in the corresponding event and a second probability associated with the second field value in the corresponding event, and wherein the first field value and the second field value correspond to the first event field and the second event field indicated in the outlier event determination command, and a set of outlier indicators, in the table format, indicating whether the corresponding event is an outlier event, wherein an event is determined to be an outlier using the probability of occurrence for the corresponding event based on probabilities associated with the first event field and the second event field indicated in the outlier event determination command.

26. The computerized system of claim 25 wherein the operations further comprise causing display of a third portion having an alert indicating the determination of at least one outlier event.

27. The computerized system of claim 25, wherein for each event of the set of events, determining a probability of occurrence for each field value of the corresponding event, and using the probabilities of occurrence determined for each field value of the corresponding event to determine the probability of occurrence for the corresponding event.

28. The computerized system of claim 25, wherein each event is associated with a timestamp extracted from the raw machine data associated with that event, and wherein a field is defined by an extraction rule for extraction a subportion of text from the portion of raw machine data in particular event to produce a value for the field for that particular event.

29. The computerized system of claim 25, wherein at least one event in the set of events includes a categorical field value and a numerical field value.

* * * * *